(No Model.)
J. M. JOHNSTON.
CORN PLANTER.
No. 386,016. Patented July 10, 1888.
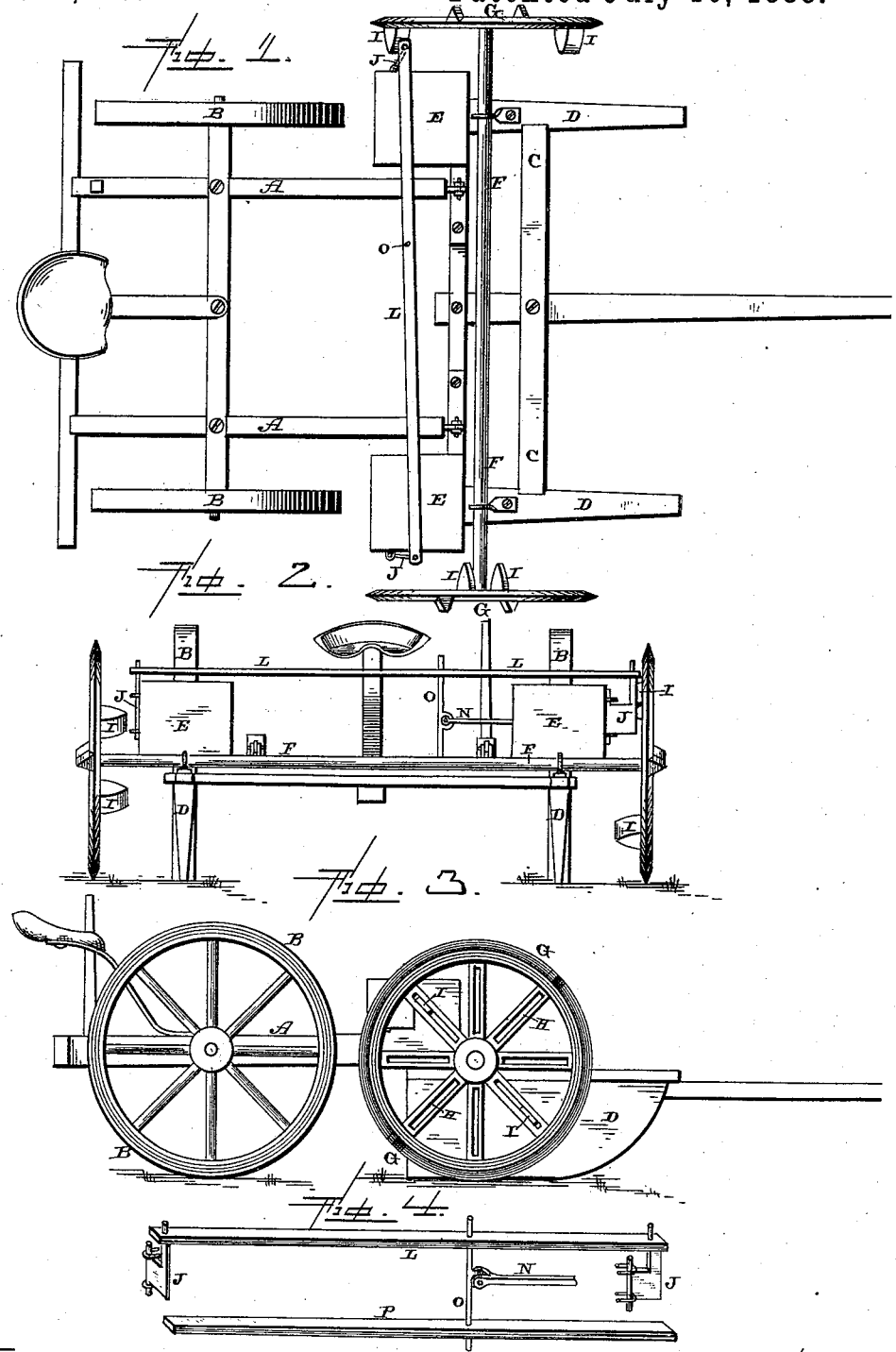
Witnesses.
L. F. Gardner
L. L. Burket
Inventor.
J. M. Johnston,
per F. A. Lehmann,
Atty.

United States Patent Office.

JOHN M. JOHNSTON, OF NEW ALBANY, KANSAS.

CORN-PLANTER.

SPECIFICATION forming part of Letters Patent No. 386,016, dated July 10, 1888.

Application filed April 16, 1888. Serial No. 270,828. (No model.)

*To all whom it may concern:*

Be it known that I, JOHN M. JOHNSTON, of New Albany, in the county of Wilson and State of Kansas, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination of two wheels provided with projections upon their inner sides and secured to the same shaft, with the seed-boxes, the pivoted levers upon their outer sides to be operated by the projections upon the wheels, a connecting-rod which extends across the machine and connects the levers together, so that they move simultaneously, a bearing or support, a lever pivoted in this bearing or support, and the seed-slide which is moved by the lever which passes through the slide and the connecting-rod, as will be more fully described hereinafter.

The object of my invention is to operate the seed-slide by means of pivoted levers placed upon the outer sides of the seed-box and which are connected together by a connecting-rod, and which connecting-rod in turn operates the seed-slide through the means of the pivoted lever and always in the opposite direction from which the connecting-rod is moved.

Figure 1 is a plan view of a planter embodying my invention. Fig. 2 is a front view. Fig. 3 is a side elevation. Fig. 4 is a perspective of the operating-levers, connecting-rod, pivoted lever, and seed-slide alone.

A represents the rear portion of the frame, which is mounted upon the wheels B, which are made sufficiently wide to act as covering devices to the dropped corn and upon which the driver's seat is placed. The front end of this frame is loosely connected to the front part, C, of the frame, which is mounted upon the furrow-opener D, and upon which are placed the two seed-boxes E. Journaled upon the top of this front frame is the shaft F, to the ends of which are rigidly secured the two wheels G, which may either have flat or sharp edges and which are provided with the slots H, in which the projections or cam I can be adjusted back and forth. These projections are made adjustable in the slots for the purpose of regulating the point at which they shall strike the operating-levers J, pivoted or hinged upon the outer sides of the seed-boxes, and the number of projections regulate the distance between the hills of corn. The edges of these wheels G bear upon the ground and are made to revolve as the machine moves forward, thus both marking the ground and operating the seed-slide at the same time. The projections I, upon the inner sides of the wheels G, are placed upon opposite sides of the wheels from the center, so that they are alternately brought into use, and thus the projection upon one wheel is made to operate the lever J upon one side, and when the shaft has made one-quarter of a revolution the projection upon the other wheel is made to operate the other lever upon the other feed-box, and thus move the slide in the opposite direction. In this manner the seed-slide is operated two or more times every revolution of the wheels, the distance between the hills of corn being regulated by the number of the projections I in the slots H.

The levers J are pivoted or hinged to the outer sides of the feed-boxes and have a prong or projection formed upon their front upper corners, and these levers are connected together by a connecting-rod, L, which extends across the tops of the feed-boxes, as shown, and thus causes the levers to always move in the same direction.

Projecting from the inner side of one of the seed-boxes is a bearing or support, N, and pivoted in the outer end of this bearing or support is the lever O, which has its upper end to pass through the connecting-rod L and its lower end to pass through the seed-slide P. When the connecting-rod is moved in one direction by one of the levers J, the lever O is made to turn upon its pivot and move the slide in the opposite direction from the one in which the connecting-rod is moved. At each movement of the seed-slide the corn is dropped.

Having thus described my invention, I claim—

The combination of the wheels G, secured rigidly to the revolving shaft, which is mounted upon the front frame, the projections upon the inner sides of the wheels, the pivoted levers secured to the outer sides of the seed-boxes, the connecting-rod for connecting the levers together, a bearing or support, the lever O, mounted in this bearing, and the seed-slide, substantially as shown and described.

In testimony whereof I affix my signature in presence of two witnesses.

JOHN M. JOHNSTON.

Witnesses:
JOSEPH H. BUTTS,
JOSEPH W. McNAIR.